United States Patent [19]

Isogai et al.

[11] Patent Number: 5,785,853

[45] Date of Patent: Jul. 28, 1998

[54] METHOD FOR ACCELERATING REVIVAL OF ENVIRONMENT

[75] Inventors: Hideaki Isogai, Kashiwa; Tomoteru Kawakami, Tsukuba, both of Japan

[73] Assignee: Agency of Industrial Science and Technology, Tokyo, Japan

[21] Appl. No.: 738,499

[22] Filed: Oct. 28, 1996

Related U.S. Application Data

[62] Division of Ser. No. 528,414, Sep. 14, 1995.

[51] Int. Cl.$^6$ .................................................. C02F 3/28
[52] U.S. Cl. ........................... 210/614; 210/631; 210/748
[58] Field of Search ................................. 210/602–605, 210/610, 613, 614, 630, 631, 748

[56] References Cited

U.S. PATENT DOCUMENTS

| | | | |
|---|---|---|---|
| 3,889,418 | 6/1975 | Porter et al. | 210/602 |
| 4,135,976 | 1/1979 | Kitajima | 210/748 |
| 4,267,038 | 5/1981 | Thompson | 210/602 |
| 4,354,936 | 10/1982 | Ishida et al. | 210/631 |
| 4,994,980 | 2/1991 | Jaubert | 210/602 |
| 5,527,464 | 6/1996 | Bartha et al. | 210/605 |

*Primary Examiner*—Thomas G. Wyse
*Attorney, Agent, or Firm*—Spencer & Frank

[57] ABSTRACT

A method and system can not only treat the sludge, harmful evacuations and so forth, to reduce load to the whole environment, but also permit recycling of those as a resource to be effectively utilized, and to quickly achieve activation of the environmental living. For this purpose, effective microorganisms are provided in an objective matter to be treated containing pollutant within a zone in the environment. The objective matter is maintained under anaerobic atmosphere. Under this condition, the effective microorganisms are activated by irradiating light and electromagnetic wave to said objective matter. A physical indicia data of said objective matter is then measured. On the basis of the physical indicia, irradiation of the light and the electromagnetic wave and anaerobic level of the anaerobic atmosphere are controlled for accelerating primary anaerobic fermenting decomposition and photosynthesis by the effective micro organisms to convert said pollutant into an organic matter useful for animals and plants.

4 Claims, 3 Drawing Sheets

METHOD FOR ACCELERATING REVIVAL OF ENVIRONMENT

This is a division of application Ser. No. 08/528,414, filed Sep. 14, 1995.

BACKGROUND OF THE INVENTION

1. Field of the Invention

The present invention relates generally to a method and an apparatus for accelerating revival or refreshment of environment, and particularly to a method and an apparatus for purification of sludge. More specifically, the invention relates to a sludge purification method and apparatus employing micro organisms. The invention also relates to a pollution control technology and an environmental preservation technology.

2. Description of the Related Art

If human beings continue and escalate their way of life currently prevailing worldwide with consuming fossil fuel and explosively increasing population, oxides of nitrogen, sulfur and carbon are produced in abruptly increasing amounts to generate and accumulate pollutants in the environment. On the other hand, by destroying forest due to expansion of farm and reckless deforestation, pollution and degradation of environment is being further accelerated year after year.

While various measures have been taken for preserving and reviving progressively injured environment, among measures, typical one is a sludge treatment, particularly a biological sludge treatment employing microorganisms.

As the sludge treatment among the biological treatment technologies which have been conventionally implemented, there is known a method of positively causing putrefaction and decomposition of biodegradative organic matter to promote oxidation by forcibly feeding air to aerobes in an active sludge.

On the other hand, there have been adopted various defusing methods, such as desulfurization of chemical flue gas, disposition of nitrogen oxide and measures for flon. These methods are the measures for dying agricultural products and forest by acid rain containing sulfur oxide generated by burning of sulfur contained in coal, petroleum or nitrogen oxides contained in exhaust gas of automotive vehicles. Also, the automotive exhaust gas contains carbon dioxide gas similar to breath air of animals and may affect the ecosystem if exhausted in large amounts. The huge amount of carbon dioxide may cause a green house effect of the earth to destroy the environment on the earth.

The chemical method as set forth above should require different treatments depending upon the objects to be treated. Namely, in flue gas desulfurization, it is a primary method to neutralize flue gas with an alkali such as limestone, sodium hydroxide, or magnesium. In addition to these, activated charcoal absorption method can be performed. On the other hand, in flue gas denitration, nitrogen oxides of low oxidation degree are burnt in a dust coal furnace to convert into intermediate products, and further reduced with ammonia using a catalyst of zeolite and so forth. On the other hand, there is a method in which desulfurization and denitration are performed by irradiating electron beam. This method is applicable to dispose of carbon dioxide gas.

Furthermore, a mixture of photosynthetic bacteria as a primary element and lactic acid bacteria and so forth as an additional component, which mixture is called "EM" (Effective Microorganisms) because of their useful effect of synthesizing organic matter available for reviving animals and plants from polluting organic matter, or polluting accumulation, such as sulfur oxides, nitrogen oxides, carbon oxides, cyan compounds and so forth input or supplied thereto.

When a biological method is employed for the treatment of sludge with aerobes other than EM, a mechanism and a layer for forcibly feeding air to the bottom since the microorganisms used are aerobic, namely it consumes oxygen similarly to animals and outputs or discharges putrefactive oxides or organic pollutants, and for requirement to further promote putrefaction and decomposition, which is in a reverse direction to the composition, within a short period of time. Therefore, associated with continuous operation of the biological process using the aerobic microorganisms other than EM, a problem of unacceptable odor may be caused. Also, corrosion of the apparatus may be accelerated by the oxides.

Therefore, the implementation of this method per se, together with the lives of animals, promotes generation of pollution. On the other hand, in contrast to the biological treatments, continuous operation of a physico-chemical treatment plant inherently requires a huge amount of energy, such as electric power or so forth. Namely, for a sufficient power supply, a huge amount of coal and petroleum has to be consumed, which is undesirable. Furthermore, associated therewith, combustion gas is continuously generated to cancel the originally expected effect.

The EM per se has been known to have a safety in the extent equivalent to the medical supplies, in the revival or refreshment and activation of living creatures, as being said to be effective in recovery of incurable disease, such as last stage cancers, cirrhosis of the liver or so forth, and practical application of EM has already been developed to agriculture or a regional garbage treatment. The above-described methods involving the use of EM is a mere application of EM to the garbage in which EM is left as is in an natural state. Therefore, no means for accelerating treatment is applied so that a long period of time is required before attain the effect can be attained.

SUMMARY OF THE INVENTION

In such circumstance, it is an object of the present invention to establish a system which is able not only to treat the sludge, harmful evacuations, waste matter and so forth, to reduce load to the whole environment, but also to permit recycling of those as a resource to be effectively utilized, and to quickly achieve activation of living creatures in the environment.

Another object of the invention is to provide a system which is low in cost so that it can be adopted worldwide and can provide a strong effect in the preservation of the environment.

A further object of the invention is to provide a method and an apparatus which causes the system to automatically continue to operate and be effective once initiated for continuously synthesizing organic matter useful for reviving animals and plants.

A still further object of the invention is to provide a method and system for accelerating or promoting fermenting decomposition of pollutants by the effective micro organisms in the soil and/or active sludge on a large industrial scale for ultimately increasing foods, fixing amount of carbon dioxide on the earth, restoring ozone layer, by increasing and activating agricultural products and forests on the ground and increasing and activating duckweed or seaweed under the water for promoting photosynthesis.

A yet further object of the invention is to provide a method and system which can reduce harmful oxides for anti-pollution and environmental preservation.

A further object of the invention is to provide a method and system which can be adapted in scale from abridged type to a large scale plant depending upon area of the site to implement, labors and other factors so that it is possible to simultaneously implement in a worldwide scale.

A still further object of the present invention is to provide a method and system, in which, once acceleration is achieved by local application of electric power, synthesizing of organic matters useful for reviving animals and plants odorlessly by spreading fermenting decomposition in the soil by continuous acceleration with generating far infrared rays indigenously, and thus can significantly save electric power and energy since no further electric power and energy is required in operating the plant.

In order to accomplish the above-mentioned object, according to the first aspect of the invention, an environment revival acceleration method comprises the steps of:

provviding effective micro organisms in an objective matter containing a pollutant within a zone in the environment;

maintaining the objective matter under anaerobic atmosphere;

activating the effective micro organisms by irradiating light and electromagnetic wave to the objective matter;

measuring physical indicia data of the objective matter; and controlling irradiation of the light and the electromagnetic wave and anaerobic level of the anaerobic atmosphere on the basis of the physical indicia data, whereby anaerobic fermenting decomposition and photosynthesis by the effective micro organisms are primarily accelerated to convert the pollutant into an organic matter available to animals and plants.

The physical indicia data may be one of data selected among conductivity, acidity, humidity, directly enlarged image, sectional image and so on.

According to the second aspect of the invention, a sludge purification accelerating method comprises the steps of:

providing effective micro organisms in a sludge containing pollutant within a zone in the environment;

maintaining the sludge under anaerobic atmosphere;

activating the effective micro organisms by irradiating light and electromagnetic wave to the sludge;

measuring physical indicia data of the sludge; and controlling irradiation of the light and the electromagnetic wave and anaerobic level of the anaerobic atmosphere on the basis of the physical indicia data, whereby anaerobic fermenting decomposition and photosynthesis by the effective micro organisms are primarily accelerated to convert the pollutant into an organic matter useful for animals and plants.

According to the third aspect of the invention, an environment revival accelerating system comprises:

treatment zone for storing objective matter containing pollutant and effective microorganisms to be provided to the objective matter;

an energy radiating portion irradiating an energy to the objective matter containing the effective micro organisms stored in the treatment zone;

an energy introducing portion for transmitting the energy to the energy radiating portion;

an energy supply portion for supplying the energy to the energy radiating portion via the energy introducing portion;

a vacuum ventilating portion driven by the energy supply portion for maintaining the treatment zone in anaerobic atmosphere;

a measuring portion buried in the objective matter in the treatment zone for measuring physical indicia data indicative of the condition of the objective matter, and generating a signal by data conversion of the physical indicia data; and a recording, calculating and displaying portion receiving signal from the measuring portion for recording the signal, arithmetically processing the signal, making analysis for the signal and displaying the result.

The recording, calculating and displaying portion may control the energy supply portion and the vacuum ventilating portion on the basis of the result of analysis of the physical indicia data from the measuring portion. The measuring portion may include one or more sensors for obtaining one or more physical indicia data selected from conductivity, acidity, humidity, directly enlarged image, and sectional image.

The energy supply portion may include a power source oscillating portion which includes a high frequency generating means and amplifying means.

According to the fourth aspect of the invention, an environment revival accelerating system comprises:

a treatment zone for storing objective matter containing pollutant and effective microorganisms to be provided to the objective matter;

a light source for supplying a light to the objective matter containing the effective micro organisms stored in the treatment zone;

a light guide means for transmitting the light from the light source to the objective matter;

a light diffuser provided at the terminal end of the light guide means for irradiating the light from the light source to the objective matter;

a power source oscillating portion for supplying an electromagnetic wave to the objective matter containing the effective micro organisms, stored in the treatment zone;

a waveguide tube for transmitting the electromagnetic wave from the power source oscillating portion to the objective matter;

an electromagnetic wave radiating means provided at the terminal end of the wave guide tube for irradiating the electromagnetic wave from the power source oscillating portion to the objective matter;

a vacuum ventilating portion driven by the power source oscillating portion for maintaining the treatment zone in anaerobic atmosphere;

a measuring portion buried in the objective matter in the treatment zone for measuring physical indicia data indicative of the condition of the objective matter, and generating a signal by data conversion of the physical indicia data; and a recording, calculating and displaying portion receiving signal from the measuring portion for recording the signal, arithmetically processing the signal, making analysis for the signal and displaying the result.

According to the fifth aspect of the invention, an environment revival accelerating system comprises:

a treatment zone for storing a sludge containing pollutant and effective microorganisms to be provided to the sludge;

a light source for supplying a light to the sludge containing the effective micro organisms stored in the treatment zone;

a light guide means for transmitting the light from the light source to the sludge;

a light diffuser provided at the terminal end of the light guide means for irradiating the light from the light source to the sludge;

a power source and high frequency oscillator for supplying a high frequency to the sludge containing the effective micro organisms, stored in the treatment zone;

a waveguide tube for transmitting the high frequency from the power source oscillating portion to the sludge;

an underground antenna provided at the terminal end of the waveguide tube for irradiating the high frequency from the high frequency oscillator to the sludge;

a vacuum pump driven by the power source and high frequency operator for maintaining anaerobic atmosphere in the treatment zone;

a sensor buried in the sludge in the treatment zone for measuring physical indicia data indicative of the condition of the sludge, and generating a signal by data conversion of the physical indicia data;

a data converting portion for data conversion of a signal from the sensor for generating a signal;

a computer for receiving the signal from the data converting portion, recording the signal, arithmetically processing the signal and making analysis of the signal; and a display for displaying the result obtained by the computer.

The environment revival accelerating system may further comprise an additional heating mechanism comprising a pipe line network arranged in said treatment zone and connected to a hot spring for flowing hot spring water to give additional heat to said sludge.

As a preparation of operation of the system according to the present invention, a mixture consisted of a photosynthetic bacteria as primarily element, and yeast fungus, lactic acid bacteria as additive, called as effective micro organisms, which synthesize organic matter reviving animal and plant as bait from contaminants, polluting deposition, such as sulfur, nitrogen carbon oxide and cyan compound and so forth, which is already available, is provided in the deep portion of the earth densely accumulating pesticide and acid rain or the bottom in the lake. Then, the effective micro organisms are industrially activated and accelerated employing light and electromagnetic wave with accurately measuring the effect thereof.

For essential solution, as set forth above, it is desirable that the effective microorganisms themselves may safely revive living and widely spread in a large area with activating. There is a historical example in the ancient regime, in which the situation filled with pollutant and harmful matters was resolved by own purification effect of the earth. The primary elements of such purification effect of the earth was a single cell photosynthetic bacteria, such as Chromatium or Heliobacterium. Lactic acid bacteria and yeast are added to the photosynthetic bacteria as the major component to formulate the effective micro organisms "EM". By simultaneously implementing the means for converting toxic matters into reviving matters in the world wide scale by infiltration with the effect of the system of the present invention, the effect may be indigenously continued to maintain synthesis of organic matters in the direction to revive the animals and plants. This may strongly support proliferation and activation of products and forests. Thus, this can be effective measure for environmental preservation in the world wide scale to swiftly realize fixing of carbon dioxide gas and supplementing of ozone layer.

The system of the present invention is intended to provide a method for improving the situation where agricultural chemical pollution, polluting sludge are condensed in the bottom of the lake or the sea in a direction for revising the living and accelerates revival. Namely, the system according to the present invention is to industrially accelerate increasing of EM and promoting fermenting decomposition and photosynthesis effect with pollutants, such as oxide of carbon, nitrogen, sulfur accumulated in the deep portion in the earth or in active sludge in the bottom of the lake and the sea or contaminating organic matters as input nourishment source. As a result, inevitable organic matters for the products and forests on the ground and seaweeds in the sea are synthesized. Such organic matters are absorbed by the roots and trunks of plants on the ground and under the water for increasing and activating plants. Thus, in the world wide scale, huge amount of carbon dioxide assimilation is effected. Thus, ultimately, the carbon dioxide gas is fixed in a short period and other pollutants are decomposed. As set forth above, EM serves to revive animals. However, if the effect of the EM is not accelerated and leave in natural, due to lack of light and heat to the deep portion of the earth, lake and the sea, it is expected that several thousands million years may be taken to be effective, in view of process of progress of materials on the earth. Therefore, in order to decompose pollutant accumulated in the deep portion of the soil and in the active sludge in the bottom of the lake and the sea entirely in the earth, and to swiftly improve the condition into the state called as anti-bacterial fermenting synthesis type, by simultaneously accelerating photosynthesis and decomposition of the pollutant by the present invention, it becomes possible to quickly mature the soil and decompose the active sludge into an effective compost.

Therefore, this can achieve reduction for oxidation effect of over five thousands millions of people.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

A sludge treatment system according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
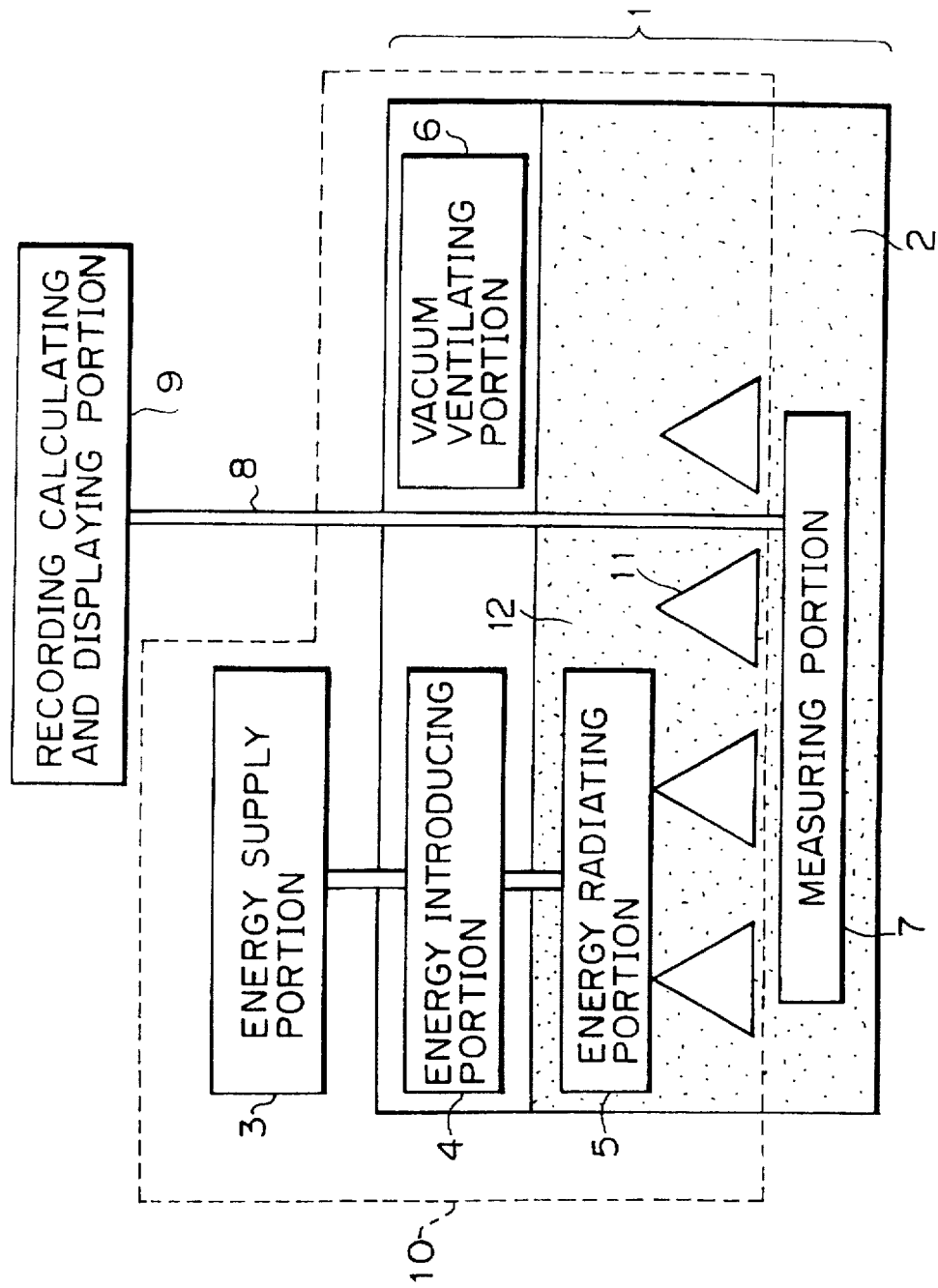
FIG. 1 is a conceptual illustration showing overall constitution of the preferred embodiment of a sludge treatment system according to the invention.

As shown in FIG. 1, an environmental preservation accelerating system according to the present invention, includes a treatment zone 1 defined in a deep portion of the earth or the bottom of a lake or the sea. In the treatment zone, a matter to be treated (hereinafter referred to as "objective matter") such as soil or sludge having accumulated therein pollutants is deposited. On the surface, an energy supply portion 3 is provided for supplying an energy in the form of light, electromagnetic wave, high frequency wave and so forth. An energy irradiating portion 5 is connected to the energy supply portion 3 via an energy introducing portion 4 for irradiating the energy to the objective matter. Within the treatment portion, a vacuum ventilating portion 6 is provided for maintaining the inside of the zone in anaerobic atmosphere. Within the objective matter 2, a measuring portion 7 is buried. The measuring portion 7 includes various sensors for measuring a conductivity, an acidity, a temperature, a humidity and so forth indicative of the condition of the objective matter, and for picking up various indicia data relating to the objective matter, such as directly picked-up enlarged image, sectional image data and so forth. The measuring portion 7 further includes a data converting portion for converting various measured indicia data into signals. The measuring portion 7 feeds the signals thus converted to a recording, calculating and displaying portion 9 via a signal line 8. The recording, calculating and displaying portion 9 records the fed signals, performs arithmetic operation of respective data and records and displays the result of analysis. On the other hand, the recording, calculating and displaying means 9 feeds back the obtained results to the energy supply portion 3 and the vacuum ventilating portion 9 to control energy (wavelength and intensity of the light or the electromagnetic wave) and degree of vacuum, namely anaerobic level. The energy required therefor is supplied from the energy supply portion 3. The energy supply portion 3, the energy radiating portion 5 and the vacuum ventilating portion 6 form an accelerating portion 10 of electromagnetic radiation and vacuum ventilation, in which the light or electromagnetic wave radiated from the energy radiating portion 5 is irradiated on the objective matter for promoting growth of the effective micro organisms (EM) contained in the irradiated objective matter (diagrammatically, the influenced regions are shown by triangular marking 12) for accelerating decomposition and conversion of the septic matter and/or pollutant into useful organic matter.

Figure 2:
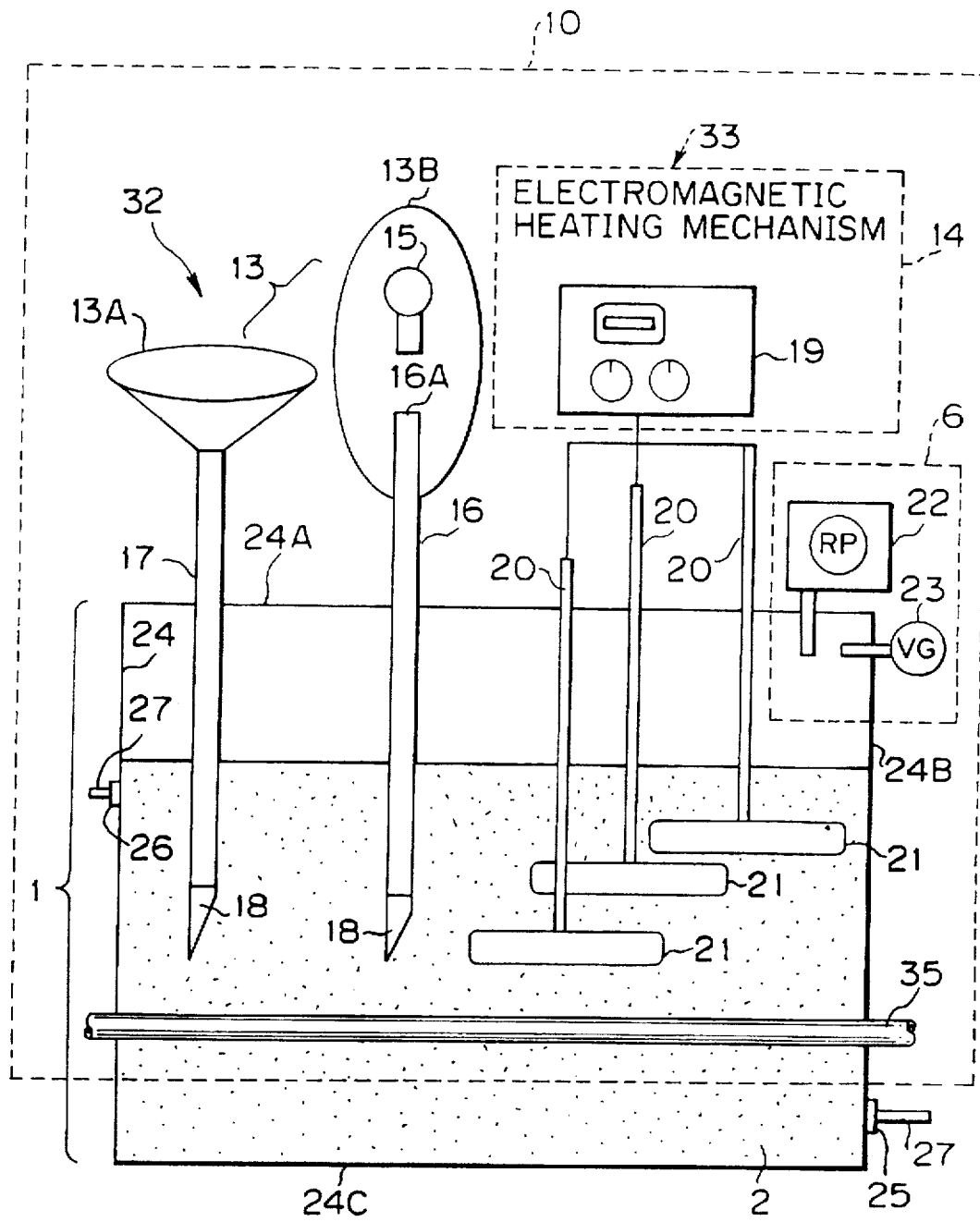
FIG. 2 is a block diagram showing a detail of an accelerating portion of the preferred embodiment a sludge purification accelerating apparatus according to the present invention.
Figure 3:
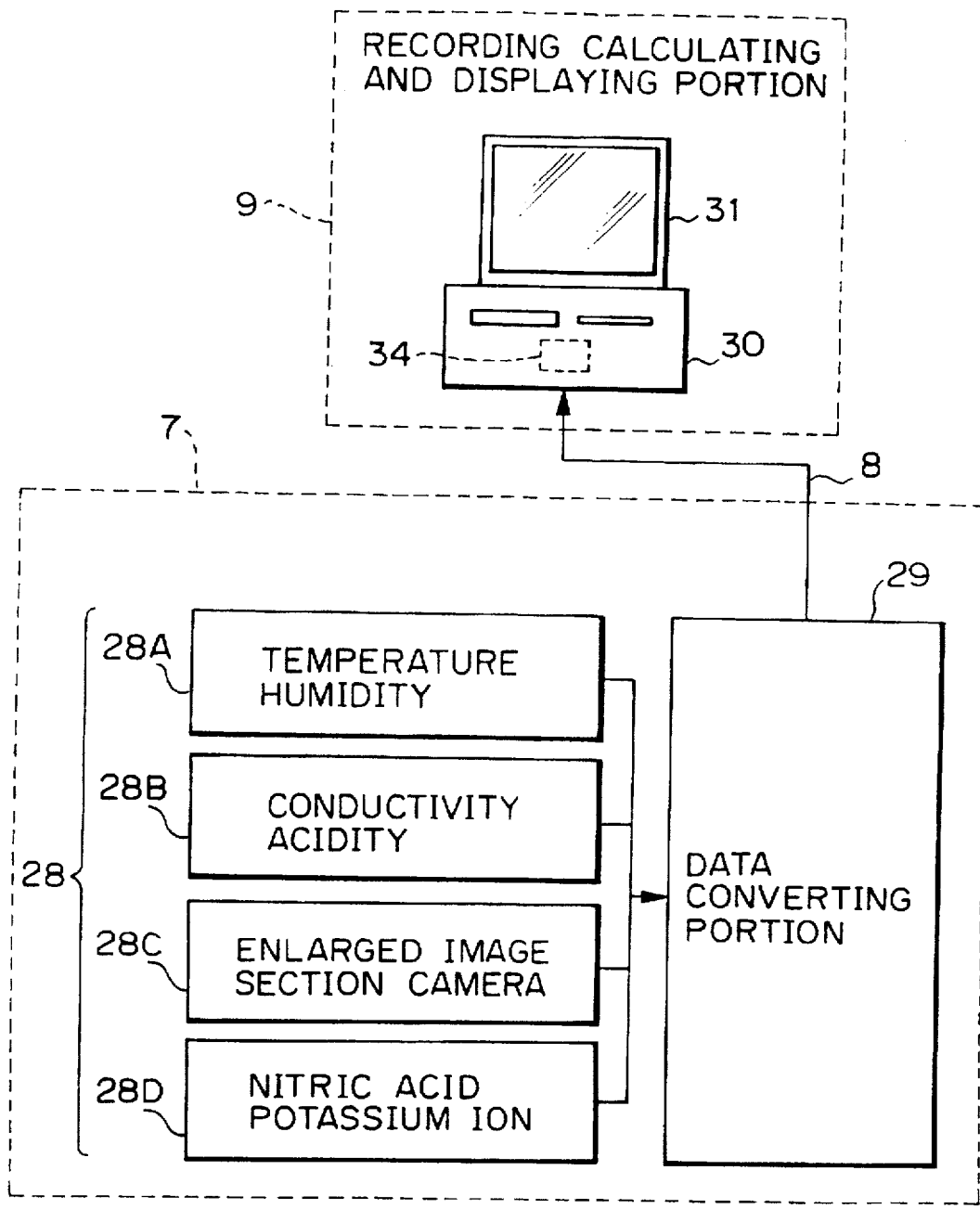
FIG. 3 is a block diagram showing a detail of a measurement portion and a recording, calculating and displaying portion in the preferred embodiment of the sludge purification accelerating apparatus according to the invention.

FIGS. 2 and 3 are block diagrams showing details of respective portions in FIG. 1. Namely, FIG. 2 shows detail of the energy supply portion 3, the energy introducing portion 4, the energy radiating portion 5 and the vacuum ventilating portion 6. The accelerating portion 10 makes it possible to modify an accelerating condition for promoting macro effect of organic active condition of the "EM" in a manner of design of experiments.

As shown in FIG. 2, the accelerating portion 10 includes a light source 13 and a power source oscillating portion 14 serving as the energy supply portion 3. As the light source 13, a daylight prevailing type light source 13A or continuous light source type light source 13b employing an oval reflection mirror. The light source 13A has a condensing portion of an arbitrary configuration suitable for condensing sun light. The oval reflection mirror to be used as the light source 13B is constructed by arranging an incandescent lamp or fluorescent lamp 15 at one of focal points of oval body in cross section, and a light transmission member, such as an optical fiber or the like, at the other focal point. It may be possible to employ either one of the light sources 13A and 13B. However, it is preferred to employ both so that both of the light sources are employed for using the light source 13B when the amount of sun light is not enough. The light from the daylight prevailing light source 13A propagates light guide cylinder 17 having reflective surface on the interior surface and discharged though a light diffuser 18 to irradiate the soil or sludge. On the other hand, the light from the continuous light source type light source 13B is incident from the tip end 16A of the optical fiber placed at the other focal point, propagates through the optical filer and is discharged through a light diffuser 18 at the terminal end of the optical fiber for irradiating the soil or sludge. The light from the light supply portion 3 (light source 13A and/or 13B) is irradiated on the soil or sludge to promote photosynthesis by "EM" contained therein and thus promote generation of organic matters, such as glucose, sucrose, starch and so forth which are useful in growth of animals and plants. On the other hand, irradiation of the light from the light source to the soil or sludge may activate "EM" therein to accelerate decomposition of septic matters and pollutant and conversion into useful organic matters.

On the other hand, the power source oscillating portion 14 supplies electric power of alternating current and direct current to the elements requiring the electric power through not shown conductors. The power source oscillating portion 14 includes a amplifying oscillator and so forth to control signals. The power source oscillating portion 14 also includes a high frequency oscillator 19 to generate a high frequency and amplify the same. The high frequency is guided through a wave guide tube 20 and radiated through an underground antenna buried in the soil or sludge as the objective matter 2 for heating the latter. By heating, an environmental temperature suitable for growth of "EM" can be provided to promote the decomposition of the septic matters and pollutants and convert them into useful organic matters. $CO_2$ generated associating with decomposition and conversion of the septic matters and the pollutants is consumed during photosynthesis of the "EM". Therefore, no matter which can be a cause of warming of the earth, will never be discharged to the atmosphere. It should be noted that oxygen generate during photosynthesis is fed and discharged into the ambient air by a vacuum pump of the vacuum ventilating portion 6. Therefore, anaerobic level in the treatment zone 1 can be maintained. The anaerobic level can be monitored by a vacuum gauge 23 provided in the vacuum ventilating portion 6. Then, the monitored data is fed to the later-mentioned recording, calculating and displaying portion 9. The anaerobic level of the treatment zone 1 is controlled by the recording, calculating and displaying portion 9 which processes the data input from the vacuum gauge for automatically or manually feeding signals according to a preliminarily set procedure.

The treatment zone 1 is typically of a box-shaped construction. Portions 24A and 24B of a wall 24 of the construction define through holes to accommodate the optical fiber, the light guide cylinder 17, the wave guide tube 20, pipes of the vacuum pump 22 and pipes of the vacuum gauge, in sealing manner. The positions of these through holes may be selected arbitrary. The wall 24 of the construction may be constructed with appropriate material having sufficient strength and durability, such as concrete, stainless steel, ceramics and so forth. On the other hand, the wall 24 of the construction may be constructed to open at only one side by neglecting the portion of the wall corresponding thereto. In the case illustrated in FIG. 2, the lower portion 24C of the wall may be neglected. In case of treating the sludge gas having a high flowability, an inlet opening 25 and an outlet opening 26 may be formed in the wall 24 of the construction for feeding-in the non-treated sludge through the inlet opening 25 by a pipeline 27 or so forth and feeding-out the treated and improved sludge into the pipeline 27 through the outlet opening 26. If necessary, a stirring device (not shown) can be provided in the treatment zone for stirring the sludge. In such case, the necessary electric power for the stirring may be supplied from the power source oscillating portion.

The measuring portion 7 buried within the objective matter 2 in the treatment zone 1 includes a sensor group 28 and a data converting portion 29, as shown in FIG. 3. The sensor group 28 includes a humidity and temperature sensor 28A for sensing humidity and temperature, a conductivity and acidity sensor 28B for sensing conductivity and acidity, an enlarged image and section camera 28C for taking an image of the objective matter, and a nitric acid and potassium sensor 28D for sensing nitric acid and potassium. The environmental indicia data, such as conductivity, acidity, temperature, humidity detected by these sensors, directly enlarged image and sectional image data and so forth are fed into the data converting portion 29. The data converting portion 29 converts the input data into signals to input to the recording, calculating and displaying portion 9. As these sensors, various known sensors employing optical, electromagnetic, and vacuum technology may be used. Also, it is possible to employ respectively independent sensors for respective indicia. It is desirable to employ a plurality of sensors to arrange those in distributed manner. The recording, calculating and displaying portion 9 incorporates a computer 30 and a display 31 of personal computer, workstation and so forth, which records the respective of input indicia data, performs arithmetic operation for processing and further performs analysis for the indicia data, and displays. Namely, on the basis of the environmental indicia data, such as the conductivity, acidity, temperature and humidity and directly enlarged image and sectional image data and so forth as physical indicia accurately associated with the current condition, the effect of acceleration, namely whether the pollutant has been converted and matured in the condition for reviving animals and plants called as ultimate anti-bacterial fermenting synthesis type by the effect of "EM" accelerated as set forth above to the contaminated portion of the deep portion of the earth or so forth by the pollutant, can be monitored automatically, continuously and quantitatively in an on-line manner. With reference to the results of analysis, radiation of the electromagnetic wave, wavelength and intensity of the light and electromagnetic wave in the accelerating portion of the vacuum ventilation and degree of vacuum in the treatment zone, i.e. anaerobic level are controlled. The necessary energy is supplied from the power source oscillating portion. It should be noted that it is possible to preliminarily input data obtained from the operation in an experimental plant in the computer 30 of the recording, calculating and displaying portion 9, to compare a data obtained as a result of acceleration in the large scale industrial implementation at the site with the preliminarily stored reference data and to automatically control the light, electromagnetic wave, and anaerobic level depending upon the results of comparison by a program software stored in the computer 30. Optionally, it is also possible to control the operation by inputting a command to the computer through a keyboard (not shown) or data communication and so forth.

As set forth above, in the method and apparatus according to the present invention, anaerobic fermenting decomposition and photosynthesis effect are primarily and industrially accelerated by providing "EM" in the pollutants present in the deep portion of the earth, or bottom of the lake or the sea and irradiating light and electromagnetic radiation energy, such as high frequency energy to the objective matter containing "EM" by a light guide system including the light source 13, the light transmission member 16, light guide cylinder 17, the light diffuser 18, and an electromagnetic heating mechanism 33 including the power source oscillating portion 14, the waveguide tube 20, the underground antenna 21.

Optionally, the accelerating portion 10 may include a pipe line network 35 as an additional heating mechanism. The pipe line network 35 may be arranged in the treating zone 1 so that it can contact the sludge and connected to a hot spring source (not shown). The pipe line network 35 flows therein a hot spring water from the hot spring source (not shown) and to give additional energy or heat to the sludge in the treating zone 1.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An environment revival acceleration method comprising the steps of:
   providing effective microorganisms in an objective matter containing pollutant within a zone in the environment;
   maintaining said objective matter under anaerobic atmosphere;
   activating said effective microorganisms by irradiating light and electromagnetic wave to said objective matter;

measuring physical indicia data of said objective matter; and controlling irradiation of the light and the electromagnetic wave and anaerobic level of the anaerobic atmosphere on the basis of said physical indicia data, whereby anaerobic fermenting decomposition and photosynthesis by the effective microorganisms are primarily accelerated to convert said pollutant into an organic matter useful for animals and plants.

2. The method as set forth in claim 1, wherein said physical indicia data is one of data selected among conductivity, acidity, humidity, directly enlarged image, sectional image.

3. A sludge purification accelerating method comprising the steps of:

providing effective microorganisms in a sludge containing pollutant within a zone in the environment;

maintaining said sludge under anaerobic atmosphere;

activating said effective microorganisms by irradiating light and electromagnetic wave to said sludge;

measuring physical indicia data of said sludge; and controlling irradiation of the light and the electromagnetic wave and anaerobic level of the anaerobic atmosphere on the basis of said physical indicia data, whereby anaerobic fermenting decomposition and photosynthesis by the effective microorganisms are primarily accelerated to convert said pollutant into an organic matter useful for animals and plants.

4. The method as set forth in claim 3, wherein said physical indicia data is one of data selected among conductivity, acidity, humidity, directly enlarged image, sectional image.

* * * * *